US006916048B2

(12) United States Patent
Ricco

(10) Patent No.: US 6,916,048 B2
(45) Date of Patent: Jul. 12, 2005

(54) DEVICE FOR FLUID-TIGHT CONNECTION OF A FITTING TO AN INTERNAL COMBUSTION ENGINE FUEL INJECTOR

(75) Inventor: Mario Ricco, Casamassima (IT)

(73) Assignee: C.R.F. Societa Consortile per Azioni, Orbassano (IT)

( * ) Notice: Subject to any disclaimer, the term of this patent is extended or adjusted under 35 U.S.C. 154(b) by 237 days.

(21) Appl. No.: 10/271,038

(22) Filed: Oct. 15, 2002

(65) Prior Publication Data

US 2003/0102387 A1 Jun. 5, 2003

(30) Foreign Application Priority Data

Oct. 12, 2001 (IT) .................................... TO2001A0968

(51) Int. Cl.[7] ................................................ F16L 35/00
(52) U.S. Cl. ........................ 285/220; 285/917; 123/468
(58) Field of Search ................................ 285/917, 220, 285/363; 123/468

(56) References Cited

U.S. PATENT DOCUMENTS 494,801 A * 4/1893 Weber ......................... 285/39
959,702 A * 5/1910 Blanchard ................... 285/329
966,870 A * 8/1910 Stoddard .................... 285/329
1,137,113 A * 4/1915 Bouchard ................... 285/329
1,523,817 A * 1/1925 Long .......................... 277/609
1,583,126 A * 5/1926 Crane .................... 285/148.19
1,905,115 A * 4/1933 Lofgren ...................... 277/614
1,959,068 A * 5/1934 Stoll .......................... 228/265
2,050,137 A * 8/1936 Walsh ........................ 285/331
2,926,937 A * 3/1960 Parsons ...................... 285/350
3,012,802 A * 12/1961 Waite ......................... 277/608
3,860,178 A 1/1975 Seifert ........................ 239/533
3,887,140 A 6/1975 Hofmann .................... 239/600
4,315,603 A 2/1982 Nakajima et al. ........ 239/533.3
4,811,976 A * 3/1989 Yagisawa .................... 285/328
5,011,192 A * 4/1991 Campo ........................ 285/23
5,052,724 A * 10/1991 Konrad et al. .............. 285/190
5,433,454 A * 7/1995 Ramberg .................... 277/643
5,669,612 A * 9/1997 Nicholson ................... 277/614
5,785,024 A * 7/1998 Takei et al. ................. 123/470
6,070,883 A * 6/2000 Marto ........................ 277/609

FOREIGN PATENT DOCUMENTS

DE 28 17 438 10/1979

* cited by examiner

*Primary Examiner*—Eric K. Nicholson
(74) *Attorney, Agent, or Firm*—Morgan & Finnegan, LLP

(57) ABSTRACT

The fitting has a high-pressure fuel supply conduit, and the injector has a hollow body having a threaded seat engaged by a threaded portion of the fitting. The fitting has a shoulder located between the threaded portion and another portion of the fitting, and the hollow body has a shoulder on a non-recessed outer surface of the hollow body. The two shoulders are precision machined so they are parallel in use; and the usual high-pressure fuel sealing washer is inserted between the two shoulders so machined. More specifically, the shoulder of the fitting has a groove housing the washer, and the shoulder of the hollow body undergoes circular spot facing to form a series of circular cavities concentric with the axis of the threaded seat and characteristic of Ra=1.6 surface roughness.

2 Claims, 1 Drawing Sheet

DEVICE FOR FLUID-TIGHT CONNECTION OF A FITTING TO AN INTERNAL COMBUSTION ENGINE FUEL INJECTOR

The present invention relates to a device for fluidtight connection of a fitting to an internal combustion engine fuel injector.

BACKGROUND OF THE INVENTION

In known technology, the fitting of the injector high-pressure fuel supply conduit has a threaded portion for engaging a threaded seat in the usual hollow body of the injector; and sealing is ensured by a sealing ring normally defined by a metal sealing washer.

In one known injector, the fitting has another portion adjacent to the threaded portion, and which normally has a polygonal section for tightening the fitting inside the threaded seat in the injector; the polygonal-section portion and the threaded portion form a first annular shoulder which, in use, faces another annular shoulder on the hollow body; and the sealing washer is positioned between a bottom surface of the threaded seat and a flat end surface of the threaded portion of the fitting. The two surfaces must therefore be machined accurately so they are flat and perpendicular to the respective axes, with a small amount of surface roughness to ensure high-pressure sealing.

The above known connecting device has various drawbacks. In particular, machining the bottom surface of the seat is extremely difficult on account of its location. Moreover, to achieve a high-pressure fuel seal, a strong fastening torque must be applied to the fitting, thus resulting in a corresponding axial load on the bottom surface of the threaded seat. The bottom surface is located at a thin portion of the hollow body, which also contains the intersection of the holes or conduits supplying high-pressure fuel to the control chamber of the metering valve, and to the injection chamber of the atomizer nozzle of the injector. This portion of the hollow body therefore represents a high stress concentration region, on account of the sharp edges of the hole intersection and the axial stress transmitted by the fitting, so that the fatigue resistance of the hollow body of the injector becomes critical.

The axial load produced by the tightening torque of the high-pressure conduit fitting may also strain the hollow body of the injector in a highly delicate region as regards high-pressure sealing, both on the washer between the hollow body and the fitting, and between the hollow body and the body of the metering valve.

SUMMARY OF THE INVENTION

It is an object of the present invention to provide a device for fluidtight connection of a fitting to an internal combustion engine fuel injector, which is highly reliable, cheap to produce, and eliminates the drawbacks of known connecting devices.

According to the present invention, there is provided a device for fluidtight connection of a fitting to an internal combustion engine fuel injector, wherein said fitting comprises a high-pressure fuel supply conduit, and said injector comprises a hollow body having a threaded seat; said fitting having a threaded portion for engaging said threaded seat with the interposition of a sealing ring; and said fitting having another portion forming, with said threaded portion, a first annular shoulder which, in use, faces a second annular shoulder on said hollow body; characterized in that said shoulders are precision machined so as to be parallel in use; and in that said sealing ring is located between said shoulders so machined.

BRIEF DESCRIPTION OF THE DRAWINGS

A preferred, non-limiting embodiment of the invention will be described by way of example with reference to the accompanying drawings, in which.

DETAILED DESCRIPTION OF THE INVENTION

Figure 1:
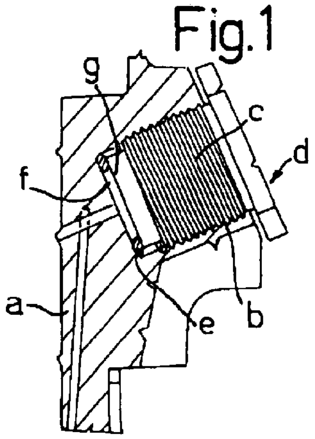
FIG. 1 shows a partial longitudinal section of a fuel injector comprising a known connecting device.

FIG. 1 shows part of a known fuel injector, in which the usual hollow body a of the injector has a threaded seat b engaged by a threaded portion c of a fitting d; and a sealing ring e is located between the bottom surface f of threaded seat b and an end surface g of threaded portion c of fitting d.

Figure 2:
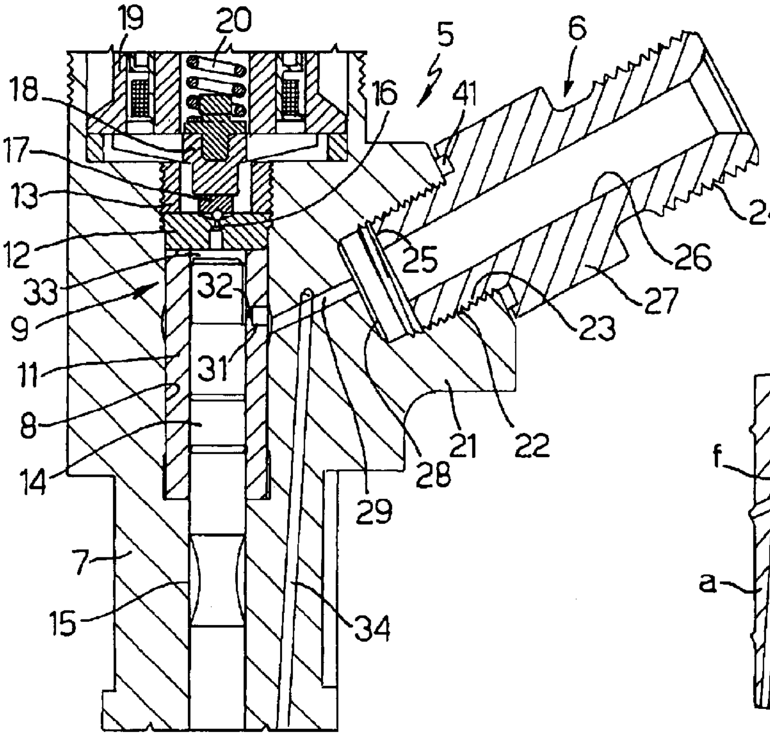
FIG. 2 shows a partial longitudinal section of a fuel injector comprising a connecting device in accordance with the invention.

Number 5 in FIG. 2 indicates as a whole a fuel injector connected to a fitting 6 by the connecting device according to the invention. Injector 5 comprises a hollow body 7 having a central cavity 8 housing a metering valve 9, which comprises a valve body defined by a sleeve 11 and by a plug 12. Sleeve 11 is force-fitted inside central cavity 8, whereas plug 12 is fixed to hollow body 7 by a ring nut 13.

A rod 14, guided by sleeve 11, slides inside a hole 15 in hollow body 7, and controls a pin for closing an atomizer nozzle (not shown) carried by hollow body 7. Plug 12 has a calibrated hole 16 for discharging valve 9, and which is normally kept closed by a shutter 17 and a spring 20, under the control of an armature 18 of an electromagnet 19.

Hollow body 7 also has a lateral appendix 21 having a threaded seat 22 engaged by a threaded portion 23 of fitting 6. Threaded portion 23 terminates at one end with an annular end surface 25; and fitting 6 also has an outer portion 24 which is connected in known manner to the usual high-pressure fuel supply conduit (not shown). As is known, the injector is supplied with fuel at at least roughly 1200-bar pressure.

Fitting 6 comprises a through hole 26 forming a fuel supply conduit to injector 5; and a mid-portion 27 located between threaded portion 23 and outer portion 24, and having a polygonal section for engagement by a wrench to tighten fitting 6 inside threaded seat 22.

Threaded seat 22 has a bottom surface 28 perpendicular to the axis of seat 22; a hole 29 extends from bottom surface 28 and comes out inside central cavity 8 of hollow body 7, at an outer annular groove 31 in sleeve 11; and groove 31 communicates, by means of a calibrated hole 32 or inlet conduit of valve 9, with a control chamber 33 of injector 5, defined by the gap between the top end of rod 14 and the calibrated hole 16 in plug 12.

Figure 3:
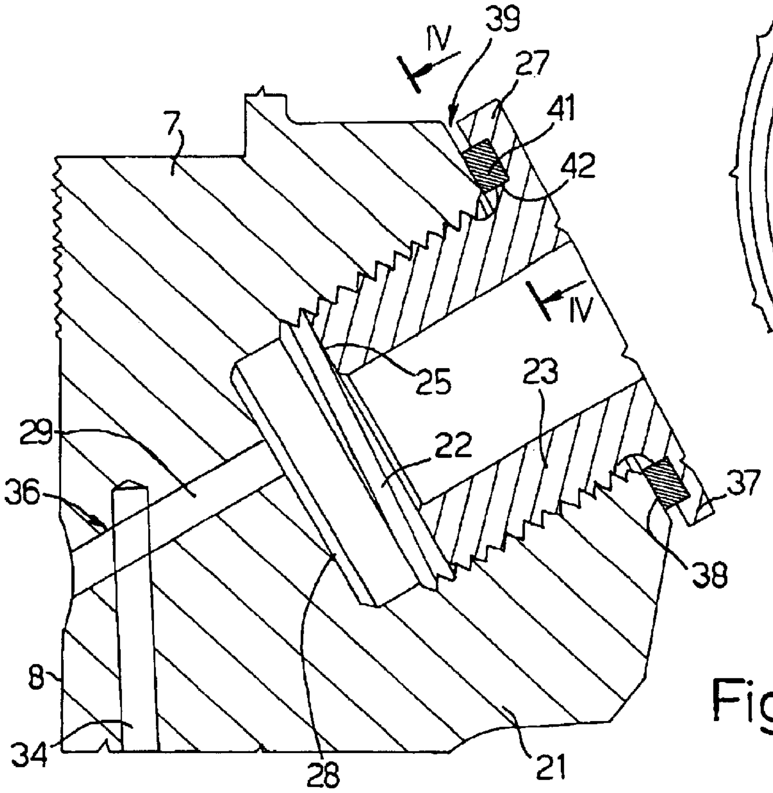
FIG. 3 shows a larger-scale portion of the FIG. 2 section.

Hollow body 7 also has a substantially longitudinal hole 34 connecting hole 29 to an injection chamber of the usual atomizer nozzle (not shown), so that the intersection of holes 29 and 34 is located at a region 36 (FIG. 3) close to seat 22 of fitting 6.

To activate injector 5, electromagnet 19 (FIG. 2) is energized temporarily to move armature 18 in opposition to spring 20; the pressurized fuel in control chamber 33 therefore opens shutter 17, thus reducing the fuel pressure, so that rod 14 moves upwards to open the fuel atomizer nozzle. When electromagnet 19 is deenergized, spring 20 closes shutter 17 by means of armature 18, thus restoring the fuel pressure in control chamber 33 and so moving rod 14 back into the nozzle-closing position.

Mid-portion 27 of fitting 6 forms, with threaded portion 23, a first annular shoulder 37 (FIG. 3) which, in use, faces a second annular shoulder 38 extending about seat 22 and defined by a non-recessed outer surface 39 of appendix 21 of hollow body 7. According to the invention, the usual sealing ring of the connection is located between the two shoulders 37 and 38, and, in particular, is defined by a metal, e.g. soft iron, washer 41 with a substantially rectangular section.

The two shoulders 37 and 38 are also machined appropriately and accurately so they are parallel in use. More specifically, the two shoulders 37 and 38 must be machined so they are perfectly flat and perpendicular to the axis of threaded portion 23 and the axis of threaded seat 22 respectively, so as to ensure perfect sealing of the high-pressure fuel seeping between seat 22 and threaded portion 23.

Figure 4:
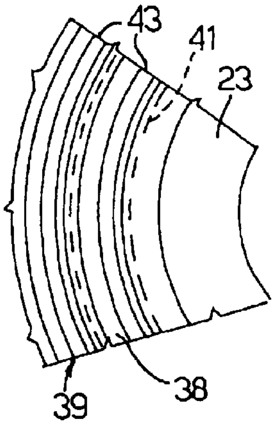
FIG. 4 shows a larger-scale partial section along line IV—IV in FIG. 3.

At least one of the two shoulders 37 and 38, preferably shoulder 37 of fitting 6, has an annular groove 42 for partly housing washer 41, so as to limit deformation of the washer when tightening fitting 6 inside seat 22. Shoulder 38 of appendix 21 is machined externally, and therefore extremely easily, and preferably undergoes so-called circular "spot facing" to obtain a series of minute circular cavities or marks 43 (FIG. 4) concentric with the axis of seat 22 and characteristic of Ra=1.6 surface roughness. Cavities 43 provide for improving, and safeguarding against impaired, sealing performance of washer 41.

Fitting 6 is fitted to injector 5 by first inserting washer 41 (FIGS. 2 and 3) inside groove 42, and engaging threaded portion 23 of fitting 6 inside seat 22 in appendix 21. Using an appropriate wrench, mid-portion 27 is then engaged and fitting 6 tightened so that washer 41 is gripped firmly against shoulder 38.

The advantages—as compared with known devices of the type shown, for example, in FIG. 1—of the connecting device according to the invention will be clear from the foregoing description. In particular, the connecting device according to the invention simplifies machining of shoulder 38, by the machined surface being external as opposed to recessed; it eliminates stress, caused by tightening fitting 6, at the intersection region 36 of holes 29 and 34 in hollow body 7; and, finally, the volume between end surface 25 of fitting 6 and bottom surface 28 of seat 22 is increased, and acts as a reservoir for supplying fuel to injector 5.

Clearly, changes may be made to the connecting device as described herein without, however, departing from the scope of the accompanying claims. For example, washer 41 may be made of material other than soft iron, and may be other than rectangular in section; shoulder 38 may project with respect to surface 39 of shoulder 38; groove 42 for washer 41 may be formed on shoulder 38 of washer 41, or both shoulders 37 and 38 may be provided with appropriate grooves; and, finally, sleeve 11 and plug 12 of the body of metering valve 9 may be formed in one piece, as opposed to two separate parts.

What is claimed is:

1. A device for fluidtight connection of a fitting to an internal combustion engine fuel injector, wherein said fitting comprises a high-pressure fuel supply conduit, and said injector comprises a hollow body having a threaded seat; said fitting having a threaded portion for engaging said threaded seat with the interposition of a sealing ring; and said fitting having another portion forming, with said threaded portion, a first annular shoulder which, in use, faces a second annular shoulder on said hollow body; characterized in that said shoulders are precision machined so as to be parallel in use; and in that said sealing ring is located between said shoulders so machined, further characterized in that said sealing ring is defined by a metal washer; wherein one of said shoulders has an annular groove for partly housing said washer, and the other of said shoulders is located on a flat, non-recessed surface and undergoes circular spot facing to obtain a series of circular cavities concentric with the axis of said threaded seat, wherein said circular cavities are characteristic of a surface roughness Ra=1.6.

2. A device as claimed in claim 1, characterized in that said washer is made of soft iron and has a rectangular section.

* * * * *